US012798309B2

(12) United States Patent
Ferrari et al.

(10) Patent No.: US 12,798,309 B2
(45) Date of Patent: Nov. 17, 2026

(54) SYSTEM AND METHOD FOR OPERATING A SAFETY SYSTEM FOR A TOWED IMPLEMENT

(71) Applicants: CNH Industrial America LLC, New Holland, PA (US); CNH Industrial Italia S.p.A., Turin (IT); Raven Industries, Inc., Sioux Falls, SD (US)

(72) Inventors: Luca Ferrari, Formigine (IT); Murali Krishnan Rajakumar, Downers Grove, IL (US); Christopher Wiegman, Oak Lawn, IL (US); Huiyan Wu, Downingtown, PA (US); Matthew Kirk Rust, Chandler, AZ (US); Andrew Karl Wilhelm Rekow, Bettendorf, IA (US)

(73) Assignees: NH Industrial America. LLC, New Holland, PA (US); CNH Industrial Italia S.p.A., Turin (IT); Raven Industries. Inc., Sioux Falls, SD (US)

( * ) Notice: Subject to any disclaimer, the term of this patent is extended or adjusted under 35 U.S.C. 154(b) by 388 days.

(21) Appl. No.: 18/526,958

(22) Filed: Dec. 1, 2023

(65) Prior Publication Data

US 2024/0181820 A1 Jun. 6, 2024

Related U.S. Application Data

(60) Provisional application No. 63/429,712, filed on Dec. 2, 2022.

(51) Int. Cl.

| | |
|---|---|
| ***B60D 1/28*** | (2006.01) |
| ***B60D 1/58*** | (2006.01) |
| ***B60R 1/26*** | (2022.01) |

(52) U.S. Cl.
CPC ................ *B60D 1/28* (2013.01); *B60D 1/58* (2013.01); *B60R 1/26* (2022.01)

(58) Field of Classification Search
CPC . B60D 1/28; B60R 1/27; G05D 1/622; G05D 1/0214; G05D 1/2424; G05D 2105/15; B60W 30/0956
See application file for complete search history.

(56) References Cited

U.S. PATENT DOCUMENTS

2016/0257308 A1* 9/2016 Pawlicki .............. G06V 20/584
2019/0014723 A1* 1/2019 Stanhope ............. A01B 73/065
(Continued)

*Primary Examiner* — Mirza F Alam
(74) *Attorney, Agent, or Firm* — Dority & Manning, P.A.

(57) ABSTRACT

In one aspect, a safety system for a towed implement may include an implement frame structured to be towed by a work vehicle. The safety system may also include an object detection sensor affixed to the implement frame with a field of view sized to capture an image scene in proximity to the implement frame, the object detection sensor structured to generate a scene signal representing the image scene. The safety system may also include a safety control system configured to generate a safety control signal based on a detection data signal, the detection data signal based on a determination of whether an object is detected in the scene signal, the detection data signal having a positive object detection indication if the object is within the image scene of the object detection sensor and a negative object detection indication if the object is not detected within the image scene.

19 Claims, 10 Drawing Sheets

(56) References Cited

U.S. PATENT DOCUMENTS

| | | | | |
|---|---|---|---|---|
| 2021/0287548 | A1* | 9/2021 | Lai | B60R 1/025 |
| 2022/0113444 | A1* | 4/2022 | Kare | G01S 17/89 |
| 2024/0023473 | A1* | 1/2024 | Iwase | A01B 69/008 |

* cited by examiner

SYSTEM AND METHOD FOR OPERATING A SAFETY SYSTEM FOR A TOWED IMPLEMENT

CROSS-REFERENCE TO RELATED APPLICATION

The present application is related and has right of priority to U.S. Provisional Patent Application No. 63/429,712 filed on Dec. 2, 2022, the entirety of which is incorporated by reference for all purposes.

FIELD OF THE INVENTION

The present disclosure generally relates to agricultural implements and, more particularly, to systems and methods for operating a safety system for a towed implement.

BACKGROUND OF THE INVENTION

It is well known that operation of autonomous farm and other work vehicles will often occur when people or other objects/obstacles are present. The objects or other obstacles may remain fixed in place as the autonomous work vehicle conducts operations but sometimes the objects or obstacles can also either move on their own or move in relation to the work vehicle. Such movement of objects can include people that are servicing the towed implement.

During autonomous operations, the work vehicle may not include a supervisory human operator that can ensure the safety of people that may be around the work vehicle. Furthermore, even in those instances in which a supervisory human operator is present, the operator may not have full knowledge of the operating area around the work vehicle.

Accordingly, an improved system and method for safely operating a work vehicle and implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a safety system for a towed implement. The safety system may include an implement frame structured to be towed by a work vehicle. The safety system may also include an object detection sensor affixed to the implement frame and having a field of view sized to capture an image scene in proximity to the implement frame, the object detection sensor structured to generate a scene signal representing the image scene captured by the object detection sensor. Further, the safety system may include a safety control system configured to generate a safety control signal based on a detection data signal, the detection data signal based on a determination of whether an object is detected in the scene signal, the detection data signal having a positive object detection indication if the object is within the image scene of the object detection sensor and a negative object detection indication if the object is not detected within the image scene of the object detection sensor.

In another aspect, the present subject matter is directed to an implement safety system. The implement control system may include an implement frame configured to be towed behind a work vehicle. The implement safety system may also include an object detection sensor affixed to the implement frame and structured to generate a scene signal within a sensor proximity of the implement frame, the scene signal representing an image scene captured by the object detection sensor. Further, the implement safety system may include a safety control system configured to receive the scene signal from the object detection sensor and determine if an object is detected in the scene signal, the safety control system further configured to generate a safety control signal indicative of a safety action in response to the object being detected by the object detection sensor.

In a further aspect, the present subject matter is directed to a method for determining a safe working condition of an implement configured to be towed by a work vehicle. The method may include generating, using a scene signal captured by an object detection sensor affixed to the implement, a detection data signal that indicates a presence or absence of an object in a sensor proximity of the implement. The method may also include evaluating the detection data signal to determine if the object is detected by the object detection sensor. Further, the method may also include generating a safety control signal based on the evaluation of the detection data signal. Further still, the method may also include in response to the safety control signal, performing at least one of: (1) inhibiting movement of the work vehicle and implement; or (2) generating a warning indication to an operator.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
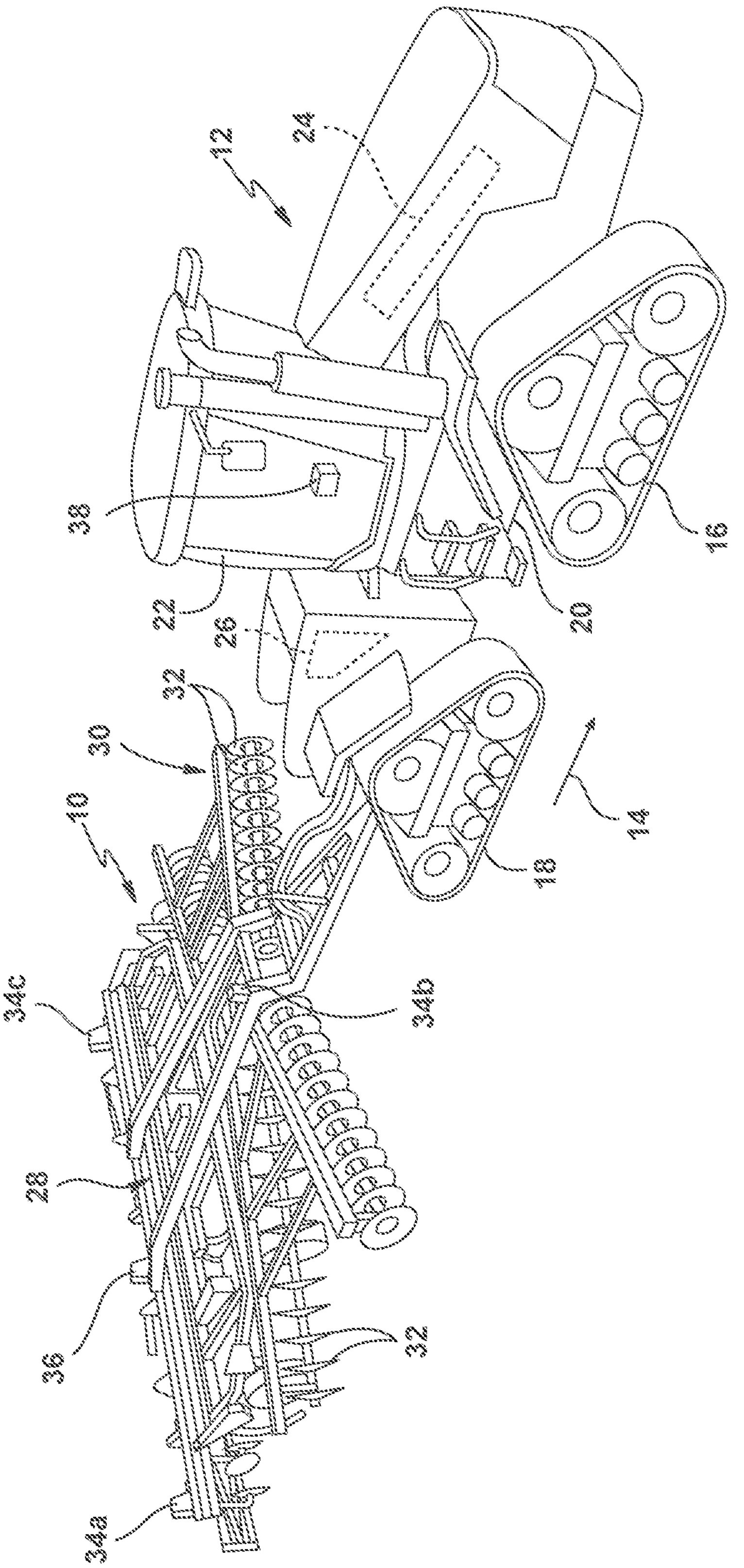
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for operating a safety system used with an implement that can be towed behind a work vehicle. In accordance with aspects of the present subject matter, the work vehicle can be autonomous such that the safety system operates within an autonomous environment. In several embodiments, an object detection sensor can be used to generate a scene signal that includes information related to an image scene captured in a field of view of the object detection sensor. The scene signal can be communicated from the object detection sensor to a data hub for further processing and/or for communication onward to a safety control system. The safety control system can evaluate the scene signal and determine whether the autonomous operation of the work vehicle and associated implement is impacted.

In accordance with aspects of the present subject matter, the safety system can monitor the field of view and generate a scene signal. The safety system can interpret whether an object is detected in the scene signal. If a detection data signal indicates the presence of an object within the image scene, the safety system can generate a safety control signal. The safety control signal can be used to inhibit an operation of the work vehicle and/or implement. In some forms, a safety zone can be monitored around the implement to ensure no objects, such as a person, are located in, on, around, or under the implement.

Referring now to the drawings, FIG. 1 illustrates a perspective view of one embodiment of an agricultural implement 10 coupled to a work vehicle 12. In general, the implement 10 may be configured to be towed across a field (or other appropriate work surface) in a direction of travel by the work vehicle 12, for example in the direction as indicated by arrow 14 in FIG. 1. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. The work vehicle 12 may include an engine 24 and a transmission 26 mounted on the chassis 20. In some forms, the engine 24 may be an internal combustion engine or other prime mover, such as a hybrid engine. In applications requiring a transmission, the transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIG. 1, the implement 10 may include a frame 28. In several embodiments, the frame 28 may be configured to support one or more sets of ground-engaging tools, such as one or more gangs 30 of disc blades 32. Each disc blade 32 may be configured to penetrate into or otherwise engage the soil as the implement 10 is being pulled through the field. In this regard, the various disc gangs 30 may be oriented at an angle relative to the direction of travel 14 to promote more effective tilling of the soil. In addition to such disc gangs 30 (or as an alternative thereto), the implement frame 28 may support various other types of ground-engaging tools, such as shank assemblies, rolling baskets, leveling discs, tines, and/or the like.

An operator's cab 22 may be supported by a portion of the chassis 20 and may house various input devices for permitting an operator to control the operation of one or more components of the work vehicle 12 and/or one or more components of the implement 10. In some forms, the work vehicle 12 may lack an operator's cab 22, such as embodiments in which the work vehicle is completely autonomous and lacking in operator interfaces. The work vehicle 12 can be a fully autonomous or semi-autonomous vehicle which, in some forms, can still include operator interfaces capable of overriding autonomous system operation.

The implement 10 includes one or more object detection sensors 34*a*, 34*b*, and 34*c* which are structured to communicate data to a data hub 36. Any of the sensor(s) 36 and data hub 40 can be affixed to the implement 10 in any suitable manner. To set forth just a few non-limiting examples, the sensor(s) 36 can be attached or supported on the implement 10, integrated within one or more components of the implement 10, or otherwise connected to the implement 10 such that decoupling of the implement 10 from the work vehicle 10 results in the sensor(s) 36 and data hub 40 travelling with the implement 10 at the exclusion of the work vehicle 10

The object detection sensors 34*a*, 34*b*, and 34*c* are structured to generate information useful to assess the environment around the implement 10, including the presence of any objects that appear in or around the work vehicle 12 and/or implement 10 that may be of danger to operation of the implement 10. For example, information generated by the object detection sensors 34 (the bare numeral 34 without an alphabetic suffix refers generally to any or all of the object detection sensors 34*a*, 34*b*, and 34*c*) can be used to detect whether a person has entered into proximity with any part of the implement 10. The detection of the object can occur in the object detection sensor 34 (such as a sensor that includes on-board, or edge, processing), or can occur in the data hub 36 or within a data processing system associated with the work vehicle 12. Such proximity detection can include an identification of the object (e.g., an identification that the object is a person) and/or the range to or location of the object from any part of the implement 10. As will be appreciated from the discussion herein, the data hub 36 is capable of receiving and passing along information but can also receive and process data prior to passing such processing along to another device.

The object detection sensors 34 can take any variety of forms useful to detect the proximity of an object intruding into an operating space, or potential operating space, of the work vehicle 12 and/or implement 10. The object detection sensors 34 are structured to capture an image scene which includes an area in proximity to the work vehicle 12 and/or implement frame 10, and then to generate a scene signal representing the image scene. The scene signal can include a transmission from the object detection sensor 34 of the raw data of scene information as sensed in the sensor, a transmission that includes calculated data related to the raw data, and/or a representation of the data whether calculated or raw residing in a computing device associated with the object detection sensor 34 or a device, such as the data hub, that receives the data from the sensor 34.

In one embodiment, the object detection sensor 34 can take the form of a camera. Camera can be 2-D or 3-D. The camera can capture images in a variety of wavelengths, including visible wavelengths, near infrared, and infrared. The camera can also capture images at a variety of resolutions. In some forms, the camera can capture still images while in others the camera can capture moving images at a variety of frame rates. In short, the camera can take on a variety of forms.

Further to the above, the camera object detection sensor is capable of generating image data that can be operated upon by the camera object detection sensor and/or the raw data can be transmitted to other devices using any suitable type of communication, such as through wired or wireless communication where further data reduction can take place. Whether raw or processed, the camera is structured to generate a scene signal representative of the image scene. Examples of data reduction of the raw data include detecting objects within the image data (so called "object detection") as well as possible determination of a detection confidence. A detection confidence is a metric provided as a consequence of detecting an object that measures the confidence by which the object is detected. For example, if the object detection from camera image data results in an identification that the object is a person, an object detection confidence can also be provided to estimate the confidence by which the object detection algorithm has identified the object as a person. An output of the object detection, therefore, can include a detection data signal reflective of an identification within the image of an object (e.g., a bounding box and/or mask), the type of object, and a detection confidence of the type of object. The detection data signal, as will be appreciated in the discussion above, can be determined in the camera object detection sensor or another device using the scene signal provided by the camera object detection sensor. Whether the raw data is processed at the camera and communicated to other devices for processing therein (e.g., the data hub 36), or the raw data is passed to other devices for further computation, such data reduction of the image into useful information (e.g., identification within the image of an object, type of object, and confidence of detection) is useful in a safety system as will be described further below. In some embodiments, a range to or location of the object in the image may also be calculated.

In another embodiment, the object detection sensor can take the form of a light detection and ranging (LiDAR) system capable of generating point cloud data useful in providing ranging or distance information to points or objects within the dataset. The LiDAR can have any variety of resolution, frame rates, and viewing angles. It will be appreciated that the point cloud information can be communicated to other devices (e.g., the data hub 36) whereupon further computations can be performed, or information related to the point cloud can be operated upon further by the LiDAR system. The data from the LiDAR system can be communicated through any suitable techniques, including wired or wireless communication.

Similar to image data collected from camera object detection sensors, data collected from the LiDAR system can be further processed by detecting objects in the point cloud data. Further, object detection techniques as applied to point cloud data can also include an identification within the point cloud data of an object, identification of the type of object, and a confidence of detection. As with the camera object detection sensor above, an output of the object detection using information collected from the LiDAR object detection sensor can include a detection data signal reflective of an identification of an object within the image scene captured by the LiDAR sensor, the type of object, and/or a detection confidence of the type of object. The detection data signal, as will be appreciated in the discussion above, can be determined in the LiDAR object detection sensor or another device using the scene signal provided by the camera object detection sensor.

In yet another embodiment, the object detection sensor can take the form of radar capable of detecting radar objects and tracking the objects through time. Any given embodiment of the radar is structured to provide any number of functions and measures, including tracking of objects, distance to or location of objects in a radar frame of reference, Doppler speed, object identification, and a confidence of object identification/confidence of detection. The data from the radar can be communicated through any suitable technique, including wired or wireless communication to any other device (e.g., the data hub 36). As with the camera/LiDAR object detection sensor above, an output of the object detection using information collected from the radar object detection sensor can include a detection data signal reflective of an identification of an object within the image scene captured by the radar sensor, the type of object, and/or a detection confidence of the type of object. The detection data signal, as will be appreciated in the discussion above, can be determined in the radar object detection sensor or another device using the scene signal provided by the camera object detection sensor.

In yet another embodiment, the object detection sensor can take the form of an ultrasonic sensor (or, in some forms, an array of ultrasonic sensors). The ultrasonic sensor can be used as a ranging device, where an object placed in proximity to the ultrasonic sensor can be sensed and a scene signal generated representing an image scene captured by the object detection sensor. In this regard, the scene signal may represent a distance measure that, when combined with a nominal value of a distance measure, indicates the presence of an object in the image scene.

Although the image scenes captured by any of the sensors 34 described above can be used to detect the presence of an object/particular object by evaluating the scene signal provide from the sensor 34, in some embodiments the scene signals may be used to provide a disparity map. As used herein, a disparity map is a determination that a scene signal of an image scene captured at a first moment of time can be compared to a scene signal of the same (or approximately the same) image scene at another moment in time. The comparison can yield a disparity map that may indicate the presence of an object to which a safety control system 38 is expected to address. The comparison which yields the disparity map can be performed in the sensor 34, the data hub 36, or the safety control system 38. Although the discussion below focuses on detecting an object, it will be understood that such detection of an object can include the detection of a difference through the disparity map, and that such detection of the difference is sufficient to declare the presence of an object, such as a person, for example.

Some object detection sensors can be fused together to form fused proximity data, which can include information from one or more object detection sensors. For example, data from both a camera object detection sensor and a LiDAR object detection sensor can be fused together in which: data from the camera can be used to identify an object; a confidence of detection can be provided of the object using data from the camera; and ranging and/or location information can be provided using data from the LiDAR system. Calibrating the image data coordinate system to the LiDAR coordinate system can be performed using standard techniques in the art. The fusion of the separate object detection sensors can be performed by the data hub 36 or another system (such as the safety control system 38 described in greater detail further below).

In any given application of the implement 10, the object detection sensor(s) 34 used can all take the same types/forms (e.g., all object detection sensors can be RGB cameras), while in other applications the object detection sensor(s) can take on a mix of types/forms. In one non-limiting example, the implement 10 can include a radar and camera while in another non-limiting example the implement 10 may only include a series of ultrasonic object detection sensors distributed around the implement 10. Other embodiments are depicted further below. In short, any mix of types/forms and any number of object detection sensors 34 can be used on the implement 10 to assist in identifying an object in proximity to the work vehicle 12 and/or implement 10 based on the scene signal. In some forms, this also includes providing a confidence of the identification of the object, and a distance to or location of the object to either or both of the work vehicle 12 and implement 10 based on the scene signal.

In keeping with the above, the object detection sensors 34 (whether the camera, LiDAR, radar, or ultrasonic) are structured to capture information related to an image scene, generate a scene signal, and communicate the information in the scene signal (either raw or processed) to the data hub 36 through either wired or wireless communication with the data hub 36. The data hub 36 can be a local computing device useful to process data collected from the sensors and generate a detection data signal based on whether an object is detected in the scene signal(s) provided from the sensor (s). In any given application of work vehicle 12 and/or implement 10, the object detection sensors 34 can all be configured to communicate by either wired or wireless communication to the data hub 36, but in other applications some object detection sensors 34 may communicate by wired techniques while other object detection sensors 34 may communicate through wireless techniques.

The data hub 36 can communicate data to any number of destinations, including to a cloud computing center, and/or to another digital destination, such as, but not limited to, a display. The data communicated by the object detection sensors 34 can be the raw data collected by the various sensors 34, a computed value of the data collected from the various sensors 34, or any number of other actions dictated from computation of the data, such as issuing a control action, or an operating alert, etc. as will be described further below.

As noted above, the work vehicle 12 includes a safety control system 38 which is in communication with the data hub 36 and is used to evaluate information from the data hub 36 related to the object detection sensors 34 and modulate operation of the work vehicle 12. In general, the safety control system 38 is structured to monitor the surroundings of the work vehicle 12 and/or implement 10 based upon data collected from the object detection sensors 34 and directly or indirectly adjust the operation of the work vehicle 12.

In some embodiments, the object detection sensors can be used as proximity sensors. In these embodiments, the safety control system 38 can be configured to determine if an object is within a zone of operation of the work vehicle 12 and/or implement 10 and perform a safety action, such as, but not limited to, issuing control signals to one or more components of the work vehicle 12 (e.g., the prime mover 24) and/or generating advisory signals to be displayed to a supervisory operator so that safety related actions can be taken. As used herein, the term "object detection sensor" and "proximity sensor" can be used interchangeably where it will be understood that the sensors are capable of generating information useful to detect the type of object in the image scene and/or the location/position/etc. of the object. Also as used herein, the term "zone of operation" may sometimes be referred to as a "safety zone" in keeping with the capability of the safety control system 38 to provide a safe zone of operations about the work vehicle 12 and/or implement 10.

In certain embodiments, the "zone of operation" or "safety zone" of the work vehicle 12 and/or implement 10 can be considered as being the same as the entirety of the field of view of the object detection sensors 34. It will be appreciated that sensors 34 include a field of view which denotes the range in which the sensor 34 is capable of sensing objects. A camera object detection sensor 34, for example, can have a wide or narrow field of view depending on a lens selected for the camera. A LiDAR object detection sensor in some embodiments can have a constrained field of view relative to some cameras. The field of view can take on many shapes, and in some applications can be a cone, an expanding trapezoidal shape, or hemispherical area, but other shapes are certainly possible. The image scene captured by the sensor 34 can be dictated by the field of view, among other possible sensor characteristics. The safety control system 38 can be configured to operate such that it modulates operation of the work vehicle 12 based upon whether an object is detected by the sensor 34.

When an object is detected within the field of view, a detection data signal can be formed by the safety control system 38 indicating the presence of the object. The detection data signal can take a variety of forms including whether an object is detected (e.g., a value of "1" if an object is detected and a value of "0" if an object is not detected), and in some embodiments can also provide a confidence of object detection. In some forms, the safety control system 38 operates on the basis of whether a person is detected by the sensor 34. For example, if the safety control system 38 detects a person through evaluation of a signal from the sensor or computation of the information in the signal, the safety control system 38 can generate a safety control signal(s) to one or more components of the work vehicle 12 (e.g., the prime mover 24) which can include signals useful to make and/or inhibit operational changes to the work vehicle 12 and/or implement 10 and/or to generate advisory signals to be displayed to a supervisory operator so that safety related actions can be taken.

The safety control signals generated by the safety control system 38 when an object is detected within the safety zone and/or when a particular object type is detected in the safety zone, can be used to perform many actions. The safety control signals can be used to inhibit an engine start sequence of the work vehicle 12, and/or to inhibit movement of the work vehicle 12. Other safety related safety control signals are also contemplated, such as inhibiting or stopping an operation at the implement 10 (e.g., controlling an actuatable device to stop or halting operation such as through a solenoid of a sprayer or an actuator used during a folding operation of an implement frame, to set forth just a few examples). The safety control signals can also include those used to generate advisory signals, such as a signal to generate a display action including energizing a light (e.g., an LED), and/or generating a graphics display for an operator, and/or generate an audible warning. Such advisory signals can be used by an operator to adjust an operation or operation sequence.

A safety interlock can also be provided in the safety control system 38. Such a safety interlock can take the form of a safety interlock device that receives the detection data signal and passes along a command to a relevant system/subsystem of the work vehicle 12 and/or implement 10. Such a safety interlock device can be configured to output an activation signal for the system/subsystem only if it receives an indication in the detection data signal that no person/relevant object is detected. In the event that the safety interlock device fails to receive an indication in the detection data signal that no person/relevant object is present, the safety interlock device will not transmit an activation signal. In this manner, the relevant system/subsystem on the vehicle will only be activated (e.g., an activated engine signal is one in which commands the engine to start or to keep running) if the detection data signal indicates no person/relevant object is present. The safety interlock device can be a standalone device or can be incorporated into the safety control system 38.

In additional and/or alternative embodiments, the safety control system 38 can generate the safety control signal based not only on whether an object or particular object type is detected in the safety zone, but whether the object has exited the safety zone. The safety control system 38, therefore, can also include object tracking that determines whether an object has exited the field of view. If an exit was not detected, the safety control system can generate the safety control signal as indicated above. In other embodiments, it is possible for a person to enter the safety zone and, as a result of movement within the safety zone, become occluded from view of the sensor(s) 34. In an alternative and/or additional embodiment, the safety control system 38 can be configured to track an object via a persistence counter initiated when the object is detected. If the persistence counter has expired, then no further safety control signal need be generated. For example, in one form, the safety control system 38 can generate a safety control signal when the detection data signal indicates the presence of a person or other particular object, and once the detection data signal no longer indicates the presence of the person/object, a persistence counter can be used as an additional safety mechanism to ensure the person/object is clear of the work vehicle 12 and/or implement 10. In this manner, the persistence counter can be reset whenever the object is detected. A persistence counter of any duration is contemplated, such as, but not limited to, 1 second, 5 seconds, and 10 seconds.

The 'safety zone' over which the safety control system 38 is structured to evaluate information from the data hub 36 related to the object detection sensors 34 and modulate operation of the work vehicle 12 can, in some embodiments, be a smaller zone than the entirety of the field of view provided for any given sensor. For example, if one or more sensors has a field of view larger than required for a given application, the safety control system 38 can be configured to monitor a smaller portion of the field of view. In these embodiments, the safety zone may be a bounded zone around the work vehicle 12 and/or implement 10 and within the field of view. To determine whether an object is within a bounded safety zone of the work vehicle 12 and/or implement 10 but within the field of view requires that a position of the object be known relative to the work vehicle 12 and/or implement 10. As stated above, the safety control system 38 receives data sent from the data hub 36 based on data received from the object detection sensor(s) 34. In one form, the safety control system 38 receives data in the form of an object detection sensor signal, or a fused signal from two or more sensors 34, which can represent a data set formed by processing raw data collected by the object detection sensor(s) 34 either at the sensor(s) 34 or the data hub 36. In still further forms, the safety control system 38 can receive data and calculate the object detection sensor signal. The processed data that is included in the object detection sensor signal can include an object identification, a confidence of an object identification, and a range to and/or location of the object to the work vehicle 12 and/or implement 10. If location is included in the object detection sensor signal, such location can be expressed in a coordinate frame useful to the safety control system 38 or can be converted to such by the safety control system 38. In one form, the range estimate sent in the object detection sensor signal by the data hub 36 to the safety control system 38 can be a range calculated to the object detection sensor 34 from the person/relevant object. In still further additional and/or alternative forms, the data hub 36 can send in the object detection sensor signal a calculated range and azimuth of the object as measured from the work vehicle 12 and/or implement 10.

In one form, the range of the object can be a shortest line distance between the detected object and a portion of the work vehicle 12 and/or implement 10, but in other embodiments the range can be the range of the object from a portion of the vehicle most likely to strike the object if the work vehicle 12 and/or implement 10 continues in the current direction. As such, range information can be calculated either at the data hub 36 or safety control system 38 as a function of trajectory of the vehicle 12 and/or implement 10. Physics based kinematics modelling can be used in one or both of the data hub 36 and safety control system 38 to determine a range.

It will be appreciated that the object detection sensor signal can include raw data from one or more sensors 34, it can include data that is processed at either the object detection sensor 34 or a data hub 36, or a mix of these data streams. At a minimum, the object detection sensor signal sent to the safety control system 38 includes information that indicates the proximity of an obstacle to the work vehicle 12 and/or implement 10, whether the data is explicitly expressed in the object detection sensor signal or can be derived from the object detection sensor signal. Such proximity can therefore be expressed as a distance to the work vehicle 12 and/or implement 10 (whether it is a shortest line distance, a distance along a potential impact trajectory, etc.)

which can be used to evaluate whether the object is in a relevant safety zone of the work vehicle 12 and/or implement 10 such that issue control actions or advisory signals are to be taken by the safety control system 38.

Figure 2:
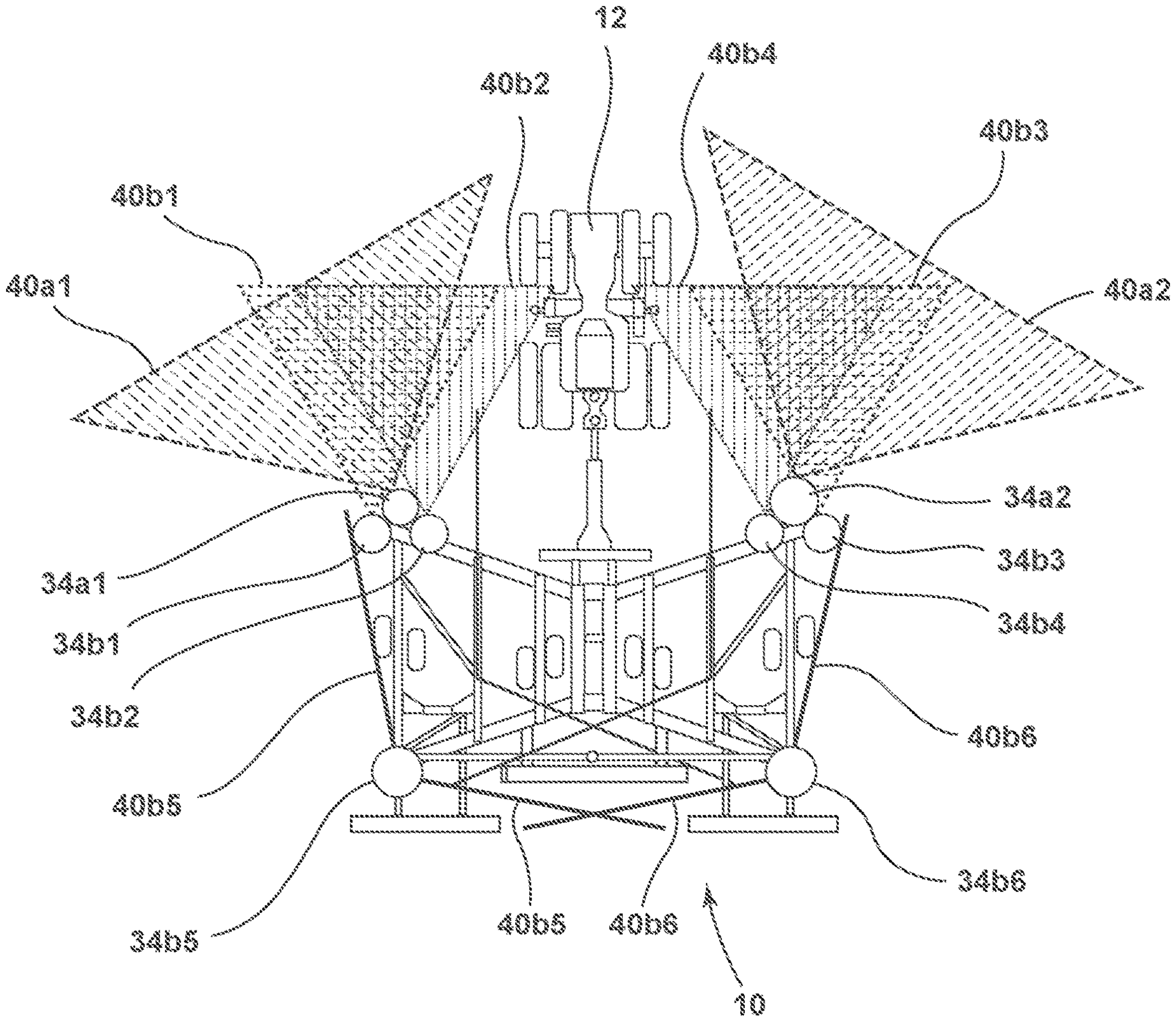
FIG. 2 illustrates a top view of one embodiment of an implement coupled to a work vehicle, with the implement having several object detection sensors in accordance with aspects of the present application.

Turning now to FIG. 2, and with continuing reference to FIG. 1, one embodiment of an implement 10 having several object detection sensors 34*al*, 34*a*2, 34*b*1, 34*b*2, 34*b*3, 34*b*4, 34*b*5, and 34*b*6 affixed to the implement 10 is illustrated in accordance with aspects of the present subject matter. Sensors having "34*a*" as a prefix are sensors of a first type, and sensors having prefix "34*b*" are sensors of a second type. References made herein to the sensor prefix, such as, for example, sensor 34*a*, will be understood to refer to all sensors having the same prefix. Sensors 34*a* are configured in the illustrated embodiment as being of the radar type described above. Sensors 34*b* are configured in the illustrated embodiment as being of the camera type described above. Each of the sensors 34*a* and 34*b* have associated fields of view 40*a* and 40*b*, respectively (the fields of view designated with a prefix "40*a*" are understood to refer to all of the fields of view associated with sensors 34*a* and the fields of view designated with a prefix "40*b*" are understood to refer to all of the fields of view associated with sensors 34*b*). As can be seen in FIG. 2, not all sensors of the same type need have a common field of view. For example, field of view 40*b*5 associated with object detection sensor 34*b*5 is wider than field of view 40*b*1 associated with object detection sensor 34*bl*.

The object detection sensors 34*b* are located at all four corners of the implement 10 to detect the presence of a person/particular object that is located in, on, or around the implement. In some embodiments the object detection sensors 34*c* can also be situated such as to capture an image scene underneath the implement 10. It will be noted that two sensors 34*b* are located on each of the forward two corners of the implement 10 which can provide a level of redundancy to ensure safe operation of the implement 10. Dual placement of the sensors 34*b* in the two forward corners can also provide 3D information in light of a stereo camera configuration. Two cameras on each forward corner also improve confidence of detection and, at the same time, reduce false positives due, for example, to non-flat terrains. The object detection sensors 34*a* are located on a forward part of the implement 10 and are used to view forward to detect upcoming objects in light of forward travel of the work vehicle 12.

Figure 3:
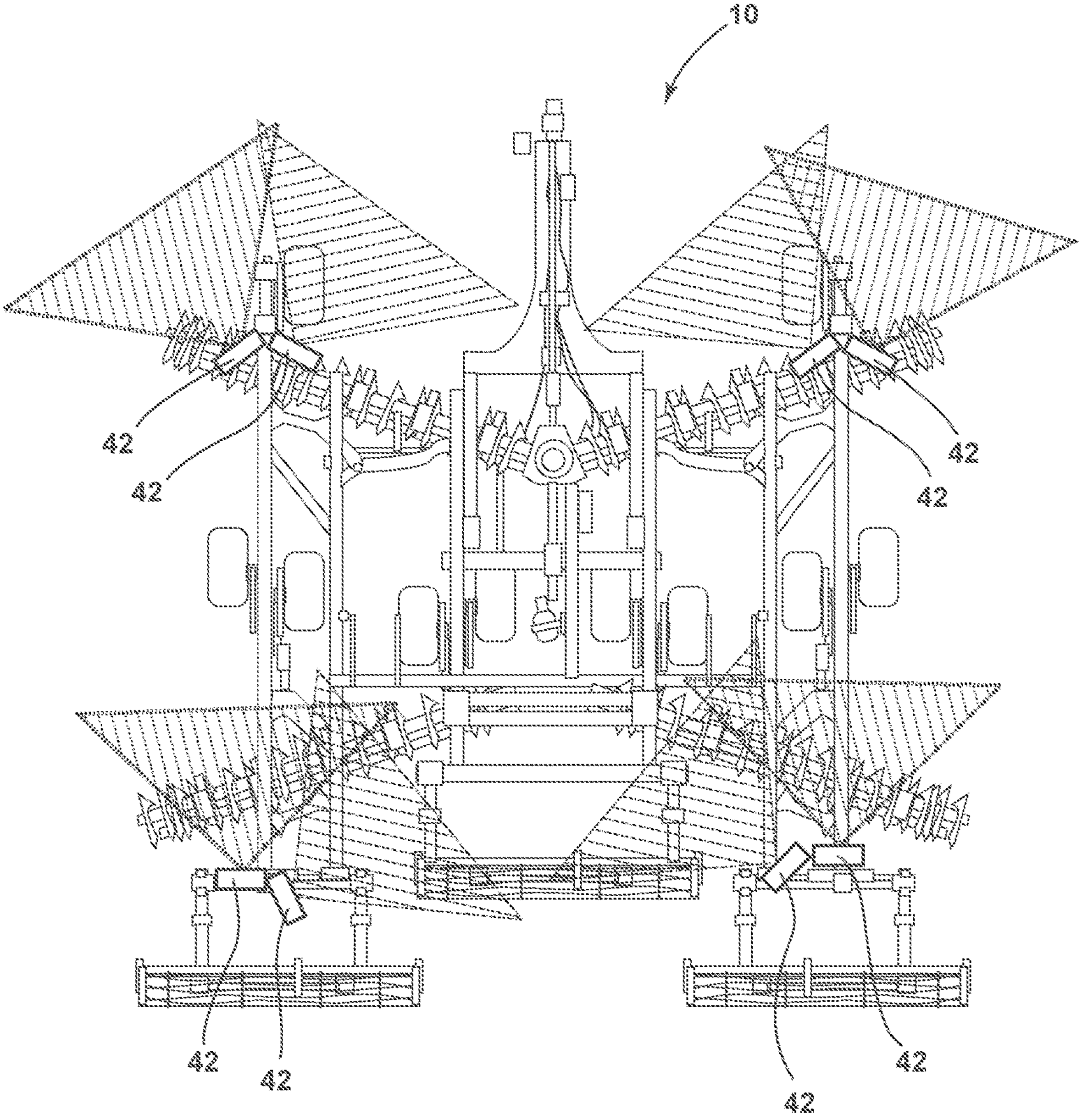
FIG. 3 illustrates a top view of one embodiment of an implement having several lighting devices in accordance with aspects of the present application.

FIG. 3 depicts an embodiment of the implement frame 10 in which several lighting devices 42 are affixed to the implement to aid in the capture of an image scene by object detection sensors (not illustrated in FIG. 3) and provide lighting conditions suitable for the object detection sensors. The lighting devices 42 can be affixed at any suitable location on, within, under, etc. the implement 10. The lighting devices 42 can have a variety of color temperatures in the visible light spectrum, and in some forms can be infrared or near-infrared lights. Although depicted in the illustrated embodiment as having all lighting devices 42 be of the same type, not all embodiments need include a homogeneity of lights. Some embodiments can include two or more different types of lights.

Figure 4:
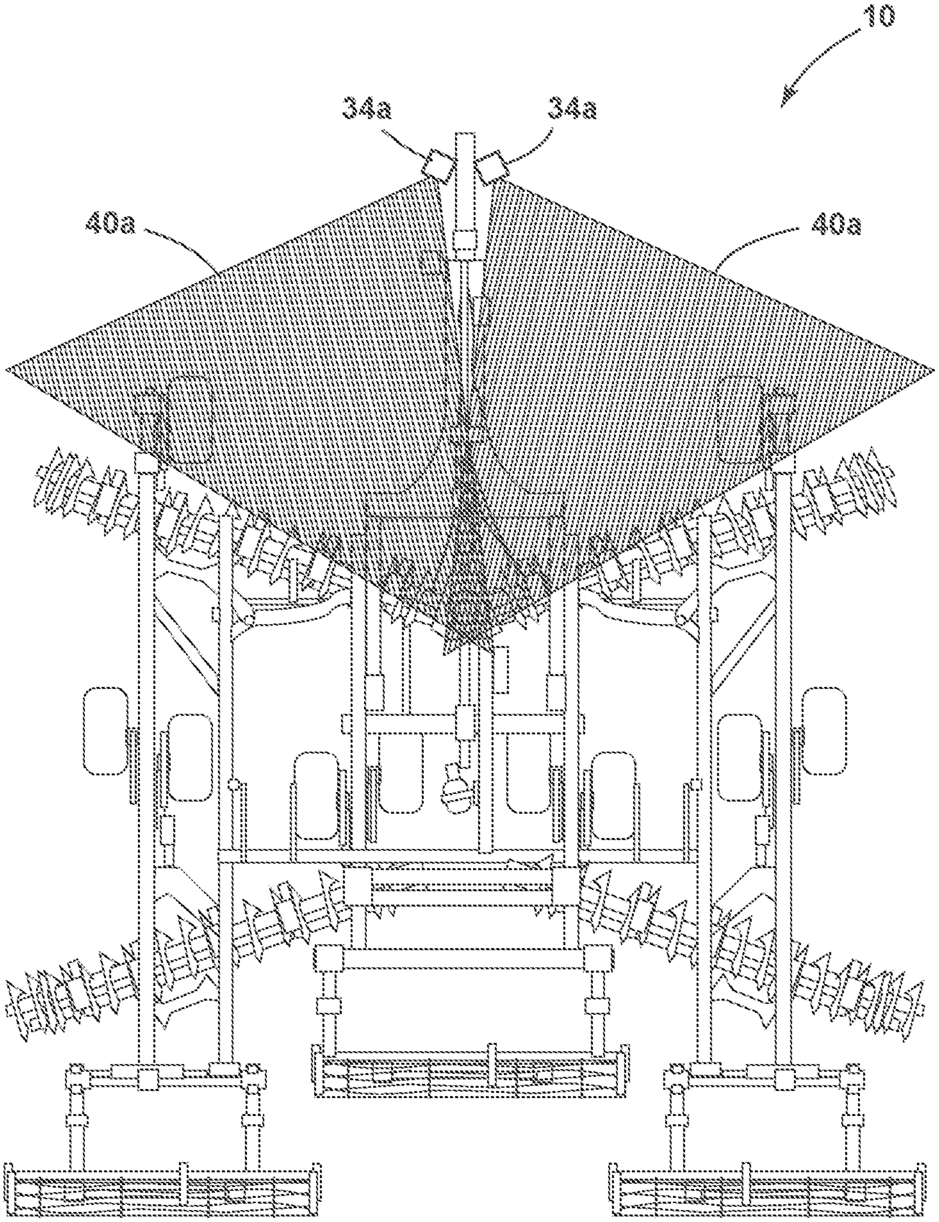
FIG. 4 illustrates a top view of one embodiment of an implement having several object detection sensors in accordance with aspects of the present application.

FIG. 4 depicts an embodiment of the implement frame 10 having object detection sensors 34*a* of an infrared type. The object detection sensors 34*a* are located in the front of the implement 10 and situated with a field of view looking to an inner part of the implement frame and directed from the front of the implement in a direction toward the rear. Such a location of IR cameras can be useful to detect the intrusion of a person into an area in a low light condition. As will be appreciated, infrared type object detection sensors 34 may not need to be supplemented with lighting as depicted in FIG. 3. It will be appreciated that although the sensors 34*a* are depicted as having similar characteristics (e.g., field of view) and of the same type, in some forms the sensors 34*a* can have different characteristics and/or be of different type.

Figure 5B:
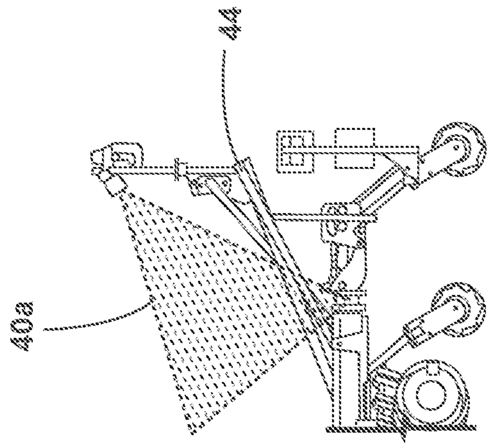
FIG. 5*b* illustrates a side of a portion of the implement shown in FIG. 5*a*, particularly illustrating an object detection sensor affixed to a mounting frame of the implement in accordance with aspects of the present application.
Figure 5A:
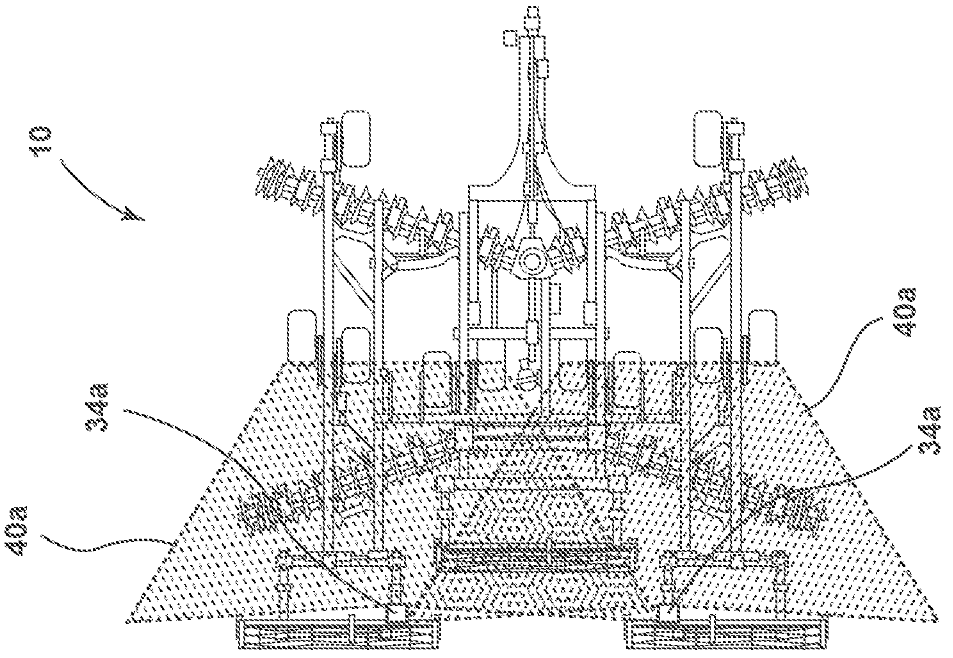
FIG. 5*a* illustrates a top view of one embodiment of an implement having several object detection sensors in accordance with aspects of the present application.

FIGS. 5*a* and 5*b* depict an embodiment of the implement frame 10 having object detection sensors 34*a* of LiDAR type. The field of view of the object detection sensors 34*a* is trapezoidal in shape, although such depiction is an approximation of the field of view. It will be appreciated in this and other figures that the object detection sensors 34 can be affixed to the implement 10 at an elevated height and pointed such that the field of view is at an angle toward the ground. The object detection sensors 34*a* in FIGS. 5A and 5B are affixed at the rear of the implement 10 and are directed forward. FIG. 5B, in particular, illustrates that the LiDAR sensors 34*a* can be affixed to the implement 10 through a mounting frame 44 that extends to the rear of the implement 10. Mounting frames can be used in other embodiments as well. The mounting frame permits the attachment of the object detection sensors 34 such that the sensors are affixed at a height and in some cases laterally offset from the implement frame to better position the sensors 34 for imaging. The mounting frame 44 can be made from any suitable material having any suitable construction. It will be appreciated that any of the object detection sensors 34 in any of the embodiments can be affixed to the implement frame 10 using a mounting frame 44. It will be appreciated that although the sensors 34*a* are depicted as having similar characteristics (e.g., field of view) and of the same type, in some forms the sensors 34*a* can have different characteristics and/or be of different type.

Figure 6:
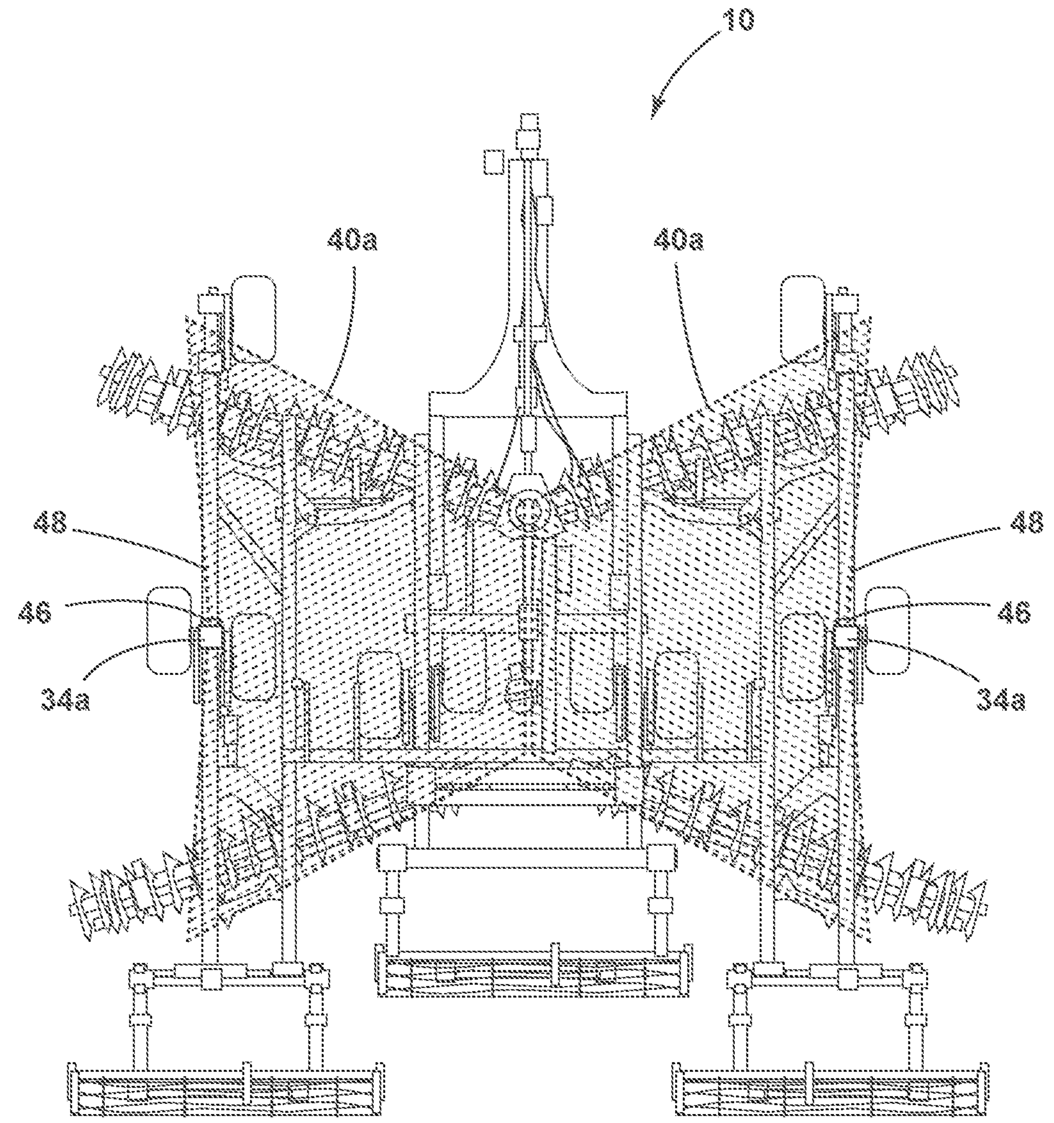
FIG. 6 illustrates a top view of one embodiment of an implement having several object detection sensors in accordance with aspects of the present application.

FIG. 6 depicts yet another embodiment where object detection sensors 34*a* are affixed to the implement frame 10 on opposing outer wing bars. The object detection sensors 34*a* are oriented to face inward to capture image scenes in the interior of the implement 10. It will be appreciated that although the sensors 34*a* are depicted as having similar characteristics (e.g., field of view) and of the same type, in some forms the sensors 34*a* can have different characteristics and/or be of different type. In some embodiments, the sensors 34*a* can be affixed to the implement frame 10 in a static condition such that the field of view 40 does not change except for instances of solid body motion of the implement frame 10, vibrations of the same, etc. In the illustrated embodiment of FIG. 6, however, the object detection sensors 34*a* are affixed to a moveable mount 46 which permits changing the orientation of the sensors 34*a*. The moveable mount permits selective and custom adjustments to the orientation of the sensors 34*a*, where a locking mechanism can be provided to fix the orientation in place. In the illustrated embodiment, however, an actuation device, such as actuator 48, is also included such that the moveable mount 44 can be selectively adjusted by a moving force imparted from the actuator 48 (where the locking mechanism may not be included) during operation of the implement frame 10. The actuation device can receive a command from the safety control system 38 to move the movable mount.

Embodiments which include sensor(s) 34*a* affixed to the implement frame using the movable mount 46 can be operated to reposition to sensor(s) 34 for different phases of operation such that the safety control system 38 detects objects and generates safety control signals based upon different fields of view of the same sensor 34*a*. For example, during a repositioning operation in which the work vehicle 12 is operated in reverse, the sensors 34*a* can be moved to point to the rear to capture an image scene. The safety control system 38 can generate a safety control signal if an object is detected to the rear before the movement operation has begun or during the movement operation. After the repositioning movement to the rear is performed, the sensors 34*a* can be moved to point to a default orientation which, in the embodiment in FIG. 6, points inward, but in other embodiments can point in other directions.

Figure 7:
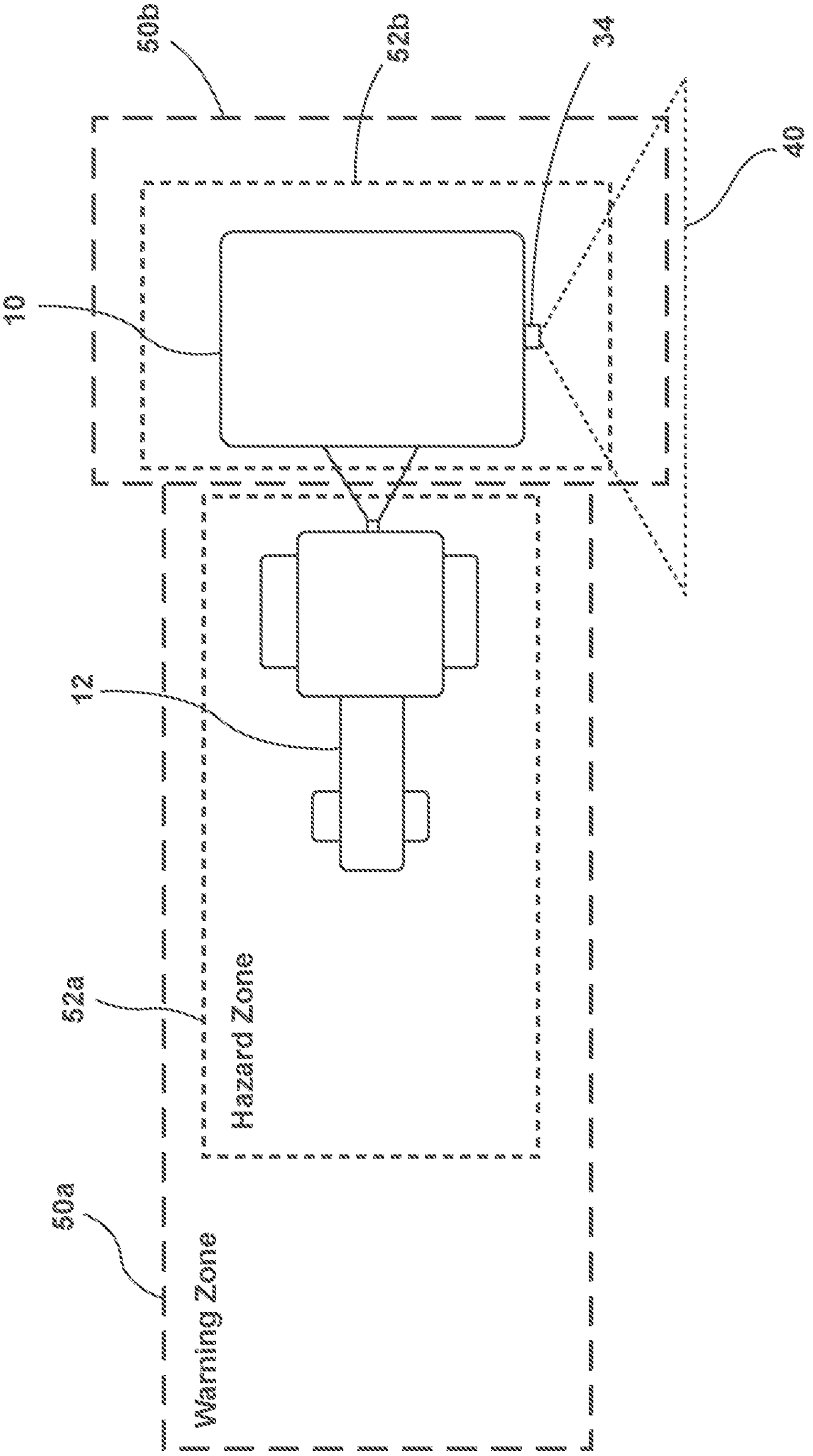
FIG. 7 illustrates a schematic view of one embodiment of safety zones and an object detection field of view in accordance with aspects of the present application.

Turning now to FIG. 7, and with continued reference to FIG. 1, one embodiment of a safety zone around the work vehicle 12 and/or implement 10 is illustrated in which the safety zone includes warning zones 50*a* and 50*b* along with hazard zones 52*a* and 52*b* for both the vehicle 12 and implement 10. As used herein, a warning zone is an area where, if no action is taken by the vehicle 12 and/or implement 10, then an obstacle detected by one or more object detection sensors 34 might enter the hazard zone. A hazard zone is considered an area which is typically smaller than the warning zone and is one in which if a detected obstacle enters the area, then potential for injury an exist due to movement of the work vehicle 12 and/or implement 10. The warning zones 50*a* and 50*b* and hazard zones 52*a* and 52*b* are demarcations determined by the safety control system 38, and which demarcations can be preconfigured in the safety control system 38 to take on any variety of configuration (e.g., shape, size, symmetry, etc.). If an object, such as a person, enters the hazard zone 52, the safety control system 38 can generate a signal useful to change an operating state of the work vehicle 12 and/or implement 10. For example, the safety control system 38 can send a signal to alter a power of the engine 24. The power signal can be issued by the safety control system 38 to the engine 24 to change a power setting or cut power entirely in some embodiments. The signal can be sent directly from the safety control system 38 to the engine 24, or can be communicated using wired or wireless techniques to another device suitable to alter the power output of the engine 24.

As will be appreciated, the safety zones 50*a*, 50*b*, 52*a*, 52*b* (collectively safety zones 50 and 52) can coincide with the fields of view 40 of the various sensors 34, but, in some forms, the safety zones 50 and 52 may be smaller than a field of view of the sensors 34*a*. To set forth just one non-limiting example, the portion of the implement 10 illustrated near the bottom of FIG. 7 depicts a sensor 34 having a field of view 40 that extends to a larger extent away from the implement 10 than the safe zones 50 and 52. In such an embodiment, the safety control system 38 can be operated as described above in which an object can be located within the field of view, its position determined, and a comparison made to assess whether the object in the field of view falls within or outside of the safety zones 50 and/or 52.

Figure 8:
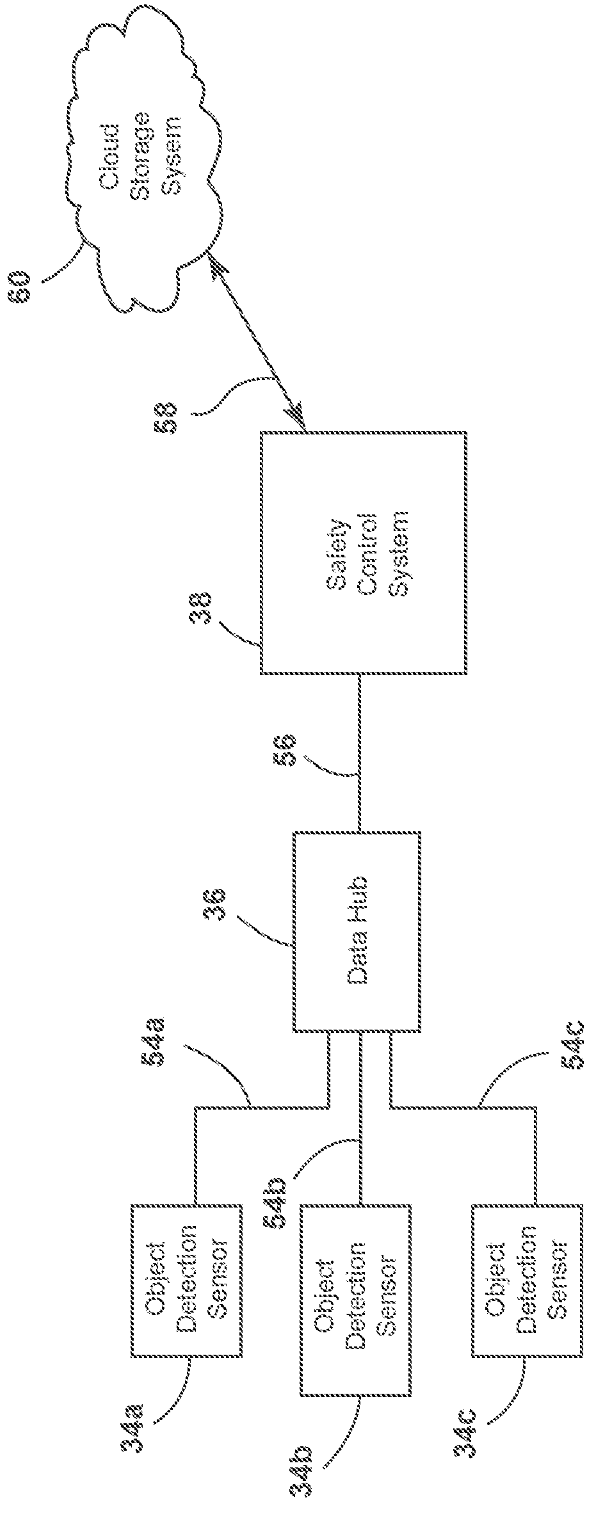
FIG. 8 illustrates a schematic view of one embodiment of object detection sensors, a data hub, and a safety control system in accordance with aspects of the present application.

Turning now to FIG. 8, one embodiment is depicted of data communication between respective operating devices of the safety system described herein. Object detection sensors 34 collect data and communicate respective signals 54 (which collectively refers to signals 54*a*, 54*b*, and 54*c*) that include content related to the image scene captured by the sensors. Such communication can be via wired or wireless connections. The data hub 36 collects the data sent by the sensors 34 and can either archive the signals and/or can communicate the signals onward via a combined signal 56 to the device 38. Such communication can be via wired or wireless connections. The combined signal 56 can take on a variety of forms, including a time division multiplexed signal representing data content related to each of the signals

54 derived from respective sensors 34. The safety control system 38 can operate upon the combined data signal 56 derived from the signals from each of the sensors 34 as described above. The safety control system 38 can communicate select data via 58 to a cloud storage system 60 or the like. Communication with cloud storage system 60 can be via wired or wireless connections, and in one non-limiting form uses cellular communication. Other types of storage systems can be used in lieu of a cloud storage system, including personal storage devices, for example. It will be appreciated that each of signals 54, 56, and 58 can be transmitted in real time, can be transmitted on demand by an operator or by any of the associated systems 34, 36, 38, and 60. It will also be appreciated that any of the systems 34, 36, 38, and 60 can archive data to be sent at a later time.

Further to the above, although the safety system described herein uses sensors 34, data hub 36, and safety control system 38, in some embodiments the sensors 34 may communicate with a data system associated with the work vehicle. One or more functions performed by the data hub 36 and safety control system 38 (e.g., generation of the safety control signal) can be performed by the data system associated with the work vehicle 12 in those embodiments where the sensors 34 communicate directly with the data system associated with the work vehicle 12. Further, in some embodiments the sensors 34 may communicate with a data hub 36 which communicates data onward to a data system associated with the work vehicle. One or more functions performed by the safety control system 38 (e.g., generation of the safety control signal) can be performed by the data system associated with the work vehicle 12 in those embodiments where the data hub 36 communicates directly with the data system associated with the work vehicle 12.

It should be appreciated that the implement 10 using object detection sensors 34, data hub 36, and safety control system 38 described above and shown in various figures is provided only to place the present subject matter in an exemplary field of use. Thus, it should be appreciated that the present subject matter may be readily adaptable to any manner of implement configuration beyond that described above.

It should also be appreciated that several devices and/or systems of the present application can take the form of a computing device. For example, an object detection sensor 34, such as a LiDAR, can have one or more computing devices embedded within useful to capture and generate useful information. Likewise, any of the data hub 36 and safety control system 38 can also take the form of a computing device.

Figure 9:
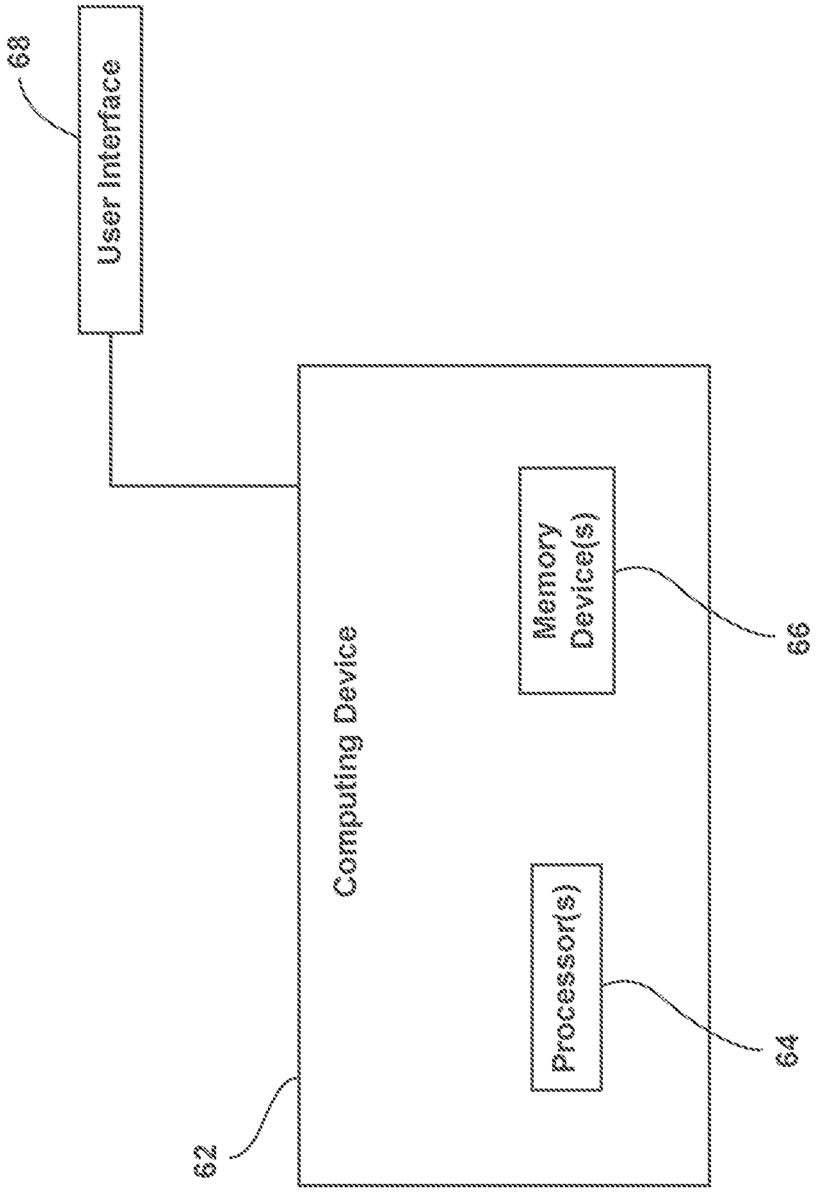
FIG. 9 illustrates a schematic view of one embodiment of a computing device in accordance with aspects of the present application.

FIG. 9 depicts a computing device useful to carry out the activities and functions for devices/systems herein, such as the object detection sensors 34, data hub 36, and safety control system 38. In general, such a computing device suitable for use herein may comprise any suitable processor-based device known in the art. Furthermore, the activities or functions of any given device/system, such as the object detection sensors 34, data hub 36, and safety control system 38, can be accomplished by one or more computing devices. A computing device 62 is depicted in FIG. 9 may include one or more processor(s) 64 and associated memory device (s) 66 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 66 of the computing device 62 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 66 may generally be configured to store suitable computer-readable instructions that, when implemented by the processor(s) 64, configure the computing device 62 to perform various computer-implemented functions, such as one or more aspects of the method 70 described below with reference to FIG. 10. In addition, the computing device 62 may also include various other suitable components, such as a communications circuit or module, one or more input/output channels, a data/control bus and/or the like.

It should be appreciated that the computing device 62 of any of the suitable devices/systems (e.g., object detection sensor 34, data hub 36, safety control system 38) may correspond to an existing computing device of the work vehicle 12 and/or implement 10, or the computing device 62 may correspond to a separate processing device. For instance, in one embodiment, any of the devices/systems described herein that can take the form of a computing device may form all or part of a separate plug-in module that may be installed within the work vehicle 12 and/or implement 10 to allow for the disclosed system and method to be implemented without requiring additional software to be uploaded onto existing devices of the work vehicle 12 and/or implement 10.

Furthermore, in one embodiment, the safety control system 38 may also include a user interface 68 useful to execute the advisory signals discussed above. More specifically, the user interface 68 may be configured to provide feedback (e.g., notifications associated with intrusion of an obstacle into any safety zone) to the operator of the implement 10. As such, the user interface 68 may include one or more feedback devices (not shown), such as display screens, speakers, warning lights, and/or the like, which are configured to communicate such feedback. In addition, some embodiments of the user interface may include one or more input devices, such as touchscreens, keypads, touchpads, knobs, buttons, sliders, switches, mice, microphones, and/or the like, which are configured to receive user inputs from the operator. In one embodiment, the user interface may be positioned within the cab of the work vehicle 12. However, in alternative embodiments, the user interface may have any suitable configuration and/or be positioned in any other suitable location.

Figure 10:
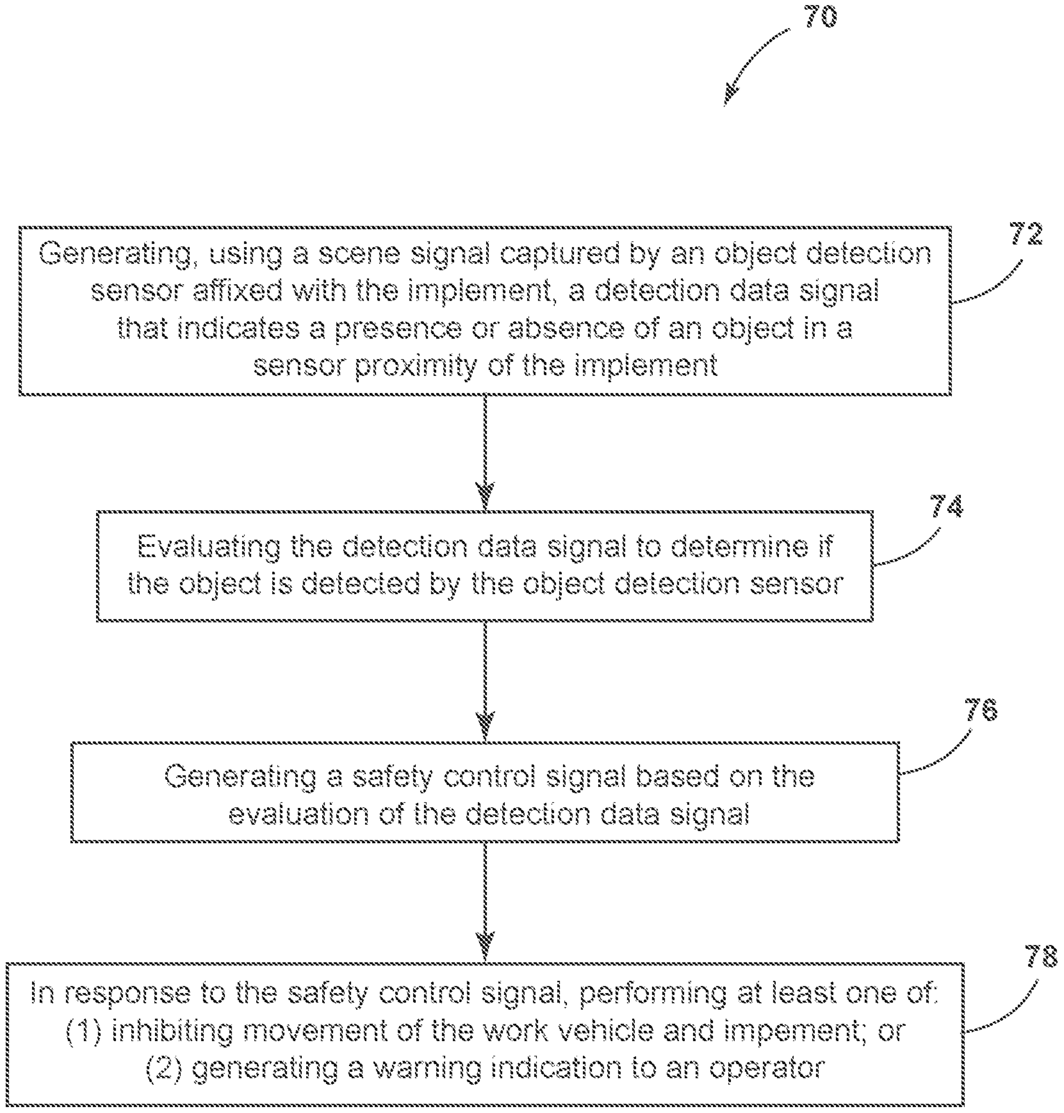
FIG. 10 illustrates a flow diagram of one embodiment of a method for determining a safe working condition of an implement being towed by a work vehicle in accordance with aspects of the present subject matter.

Referring now to FIG. 10, a flow diagram of one embodiment for determining a safe working condition of an implement being towed by a work vehicle. In general, the method 70 will be described herein with reference to the agricultural implement 10, the work vehicle 12, and the system described above with reference to FIGS. 1-9. However, it should be appreciated by those of ordinary skill in the art that the disclosed method 70 may generally be implemented with any agricultural implement having any suitable implement configuration, any work vehicle having any suitable vehicle configuration, and/or any system having any suitable system configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 10, the method 70 may include at step 72 generating, using a scene signal captured by an object detection sensor affixed to the implement, a detection data signal that indicates a presence or absence of an object in a sensor proximity of the implement. At step 74, the method 70 may also provide evaluating the detection data signal to determine if the object is detected by the object detection sensor. At step 76, the method may further include generating a safety control signal based on the evaluation of the detection data signal. The method 70 may also include in response to the safety control signal, performing at least one of: (1) inhibiting movement of the work vehicle and implement; or (2) generating a warning indication to an operator.

It is to be understood that the steps of the method 70 can be performed by a computing device 62 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by any computing device 62 described herein, such as the method 70, is implemented in software code or instructions which are tangibly stored on a tangible computer readable medium. The computing device 62 loads the software code or instructions via a direct interface with the computer readable medium or via a wired and/or wireless network. Upon loading and executing such software code or instructions by the computing device 62, the computing device 62 may perform any of the functionality of any computing device 62 described herein, including any steps of the method 70 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A safety system for a towed implement, the safety system comprising:

an implement frame structured to be towed by a work vehicle;

an object detection sensor supported on the implement frame and having a field of view sized to capture an image scene of an area in proximity to the implement frame, the object detection sensor configured to generate a scene signal representing the image scene captured by the object detection sensor;

a movable mount, the object detection sensor being supported on the implement frame via the movable mount such that movement of the movable mount moves the object detection sensor relative to the implement frame;

an actuator controllable to selectively move the movable mount; and a safety control system configured to:

receive an input indicative of a request to reposition the object detection sensor relative to the implement frame;

control the actuator to move the movable mount based at least in part on the input to reposition the object detection sensor relative to the implement frame;

receive the scene signal;

determine whether an object is detected within the scene signal;

generate a detection data signal, the detection data signal having a positive object detection indication when the object is within the image scene or a negative object detection indication when the object is not detected within the image scene; and generate a safety control signal when the detection data signal includes the positive object detection indication.

2. The safety system of claim 1, further comprising a user interface associated with the work vehicle, wherein the safety control signal is configured to control the user interface in response to the safety control signal to provide a warning indication.

3. The safety system of claim 2, wherein the warning indication is one or both of an audible warning or a visual warning.

4. The safety system of claim 1, wherein the safety control signal is configured to control one or more drive components of the work vehicle to stop the work vehicle.

5. The safety system of claim 1, wherein the object detection sensor comprises a plurality of object detection sensors supported on the implement frame, at least one of the plurality of object detection sensors being oriented with a field of view toward a portion of the implement frame, at least another of the plurality of object detection sensors being oriented with a field of view away from the implement frame.

6. The safety system of claim 1, wherein the safety control system is further configured to;

initiate a persistence counter subsequent to generating the safety control signal when the detection data signal subsequently includes the negative object detection indication; and subsequent to the persistence counter being initiated, generate a new safety control signal when the detection data signal includes the positive object detection indication before the persistence counter expires or end the safety control signal when the detection data signal does not include the positive object detection indication before the persistence counter expires.

7. The safety system of claim 1, wherein the scene signal includes information indicative of a position of the object, wherein the safety control system is further configured to compare the position of the object to a predetermined boundary of a safety zone, and wherein the safety control system is configured to generate the detection data signal having the positive object detection indication when the position of the object is within the predetermined boundary or the negative object detection indication when the position of the object is not within the predetermined boundary.

8. The safety system of claim 1, further comprising at least one lighting device supported on the implement frame, wherein the safety control system is configured to control the lighting device to emit a light to illuminate at least part of the area in proximity to the implement frame, and wherein the scene signal is generated while the lighting device emits the light.

9. The safety system of claim 1, wherein the object detection sensor comprises one or more of a camera, lidar, radar, or ultrasonic sensor.

10. The safety system of claim 1, further comprising an actuatable device connected with the implement frame, and wherein the safety control signal is configured to inhibit actuation of the actuatable device.

11. The safety system of claim 1, wherein the safety control signal is configured to engage a safety interlock to prohibit initiation of movement of the work vehicle.

12. A method for determining a safe working condition of an implement configured to be towed by a work vehicle, the method comprising:

receiving, by one or more computing devices, an input indicative of a request to reposition an object detection sensor supported on the implement, the object detection sensor having a field of view sized to capture an image scene of an area in proximity to the implement, the object sensor generating a scene signal representing the image scene; and controlling an actuator to adjust a movable mount to change an orientation of the object detection sensor, the object detection sensor being supported on the implement via the movable mount;

receiving, by one or more computing devices, the scene signal captured by the object detection sensor;

generating, by the one or more computing devices, a detection data signal based at least in part on the scene signal, the detection data signal having a positive object detection indication when an object is within the image scene or a negative object detection indication when the object is not detected within the image scene;

generating, by the one or more computing devices, a safety control signal when the detection data signal includes the positive object detection indication; and controlling, by the one or more computing devices based at least in part on the safety control signal, at least one of:

an operation of one or both of the work vehicle or the implement to inhibit movement of at least one of the work vehicle or the implement; or an operation of a user interface associated with the work vehicle to provide a warning indication to an operator.

13. The method of claim 12, wherein controlling the operation of the work vehicle to inhibit movement of the work vehicle comprises engaging a safety interlock to prohibit an engine of the work vehicle from being started.

14. The method of claim 12, further comprising controlling at least one lighting device supported on the implement to emit a light to illuminate at least part of the area in proximity to the implement, wherein the scene signal is generated while the lighting device emits the light.

15. The method of claim 12, wherein the scene signal includes information indicative of a position of the object, the method further comprising determining an intrusion of the object into a safety zone by comparing the position of the object to a predetermined boundary of the safety zone, and wherein generating the detection data signal comprises generating the detection data signal having the positive object detection indication when the position of the object is within the predetermined boundary or the negative object detection indication when the position of the object is not within the predetermined boundary.

16. The safety system of claim 1, wherein the input indicative of the request to reposition the object detection sensor is indicative of a repositioning operation, the work vehicle being driven in reverse during the repositioning operation, and wherein the safety control system is configured to control the actuator to move the movable mount for the repositioning operation such that the area in proximity to the implement frame within the field of view of the object detection sensor is at least partially rearward of the implement frame relative to a forward direction of travel.

17. The safety system of claim 16, wherein the safety control system is further configured to:

receive a further input, the further input indicating that the repositioning operation ended; and control the actuator to move the movable mount in response to the further input such that the object detection sensor is moved into a default orientation for the forward direction of travel.

18. The safety system of claim 16, wherein the safety control system is configured to receive at least the scene signal generated while the area in proximity to the implement frame within the field of view of the object detection sensor is at least partially rearward of the implement frame.

19. The method of claim 12, wherein receiving the input indicative of the request to reposition the object detection sensor comprises receiving the input indicative of a repositioning operation, the work vehicle being driven in reverse during the repositioning operation, and wherein controlling the actuator to move the movable mount comprises controlling the actuator to move the movable mount for the repositioning operation such that the area in proximity to the implement frame within the field of view of the object detection sensor is at least partially rearward of the implement frame relative to a forward direction of travel.

* * * * *